(12) United States Patent
Mori

(10) Patent No.: US 12,277,592 B2
(45) Date of Patent: Apr. 15, 2025

(54) INFORMATION-PROVIDING SYSTEM

(71) Applicant: FABRIC TOKYO INC., Tokyo (JP)

(72) Inventor: Yuichiro Mori, Tokyo (JP)

(73) Assignee: FABRIC TOKYO INC., Tokyo (JP)

(*) Notice: Subject to any disclaimer, the term of this patent is extended or adjusted under 35 U.S.C. 154(b) by 187 days.

(21) Appl. No.: 17/796,688

(22) PCT Filed: Feb. 2, 2021

(86) PCT No.: PCT/JP2021/003733
§ 371 (c)(1),
(2) Date: Aug. 1, 2022

(87) PCT Pub. No.: WO2021/157573
PCT Pub. Date: Aug. 12, 2021

(65) Prior Publication Data
US 2023/0058828 A1 Feb. 23, 2023

(30) Foreign Application Priority Data

Feb. 3, 2020 (WO) ................. PCT/JP2020/003973

(51) Int. Cl.
G06Q 30/00 (2023.01)
G06Q 30/0601 (2023.01)
(52) U.S. Cl.
CPC .............................. G06Q 30/0631 (2013.01)
(58) Field of Classification Search
None
See application file for complete search history.

(56) References Cited

U.S. PATENT DOCUMENTS 10,776,417 B1 * 9/2020 Ravichandran ........ G06N 5/046
2019/0139120 A1 * 5/2019 Agrawal ................ G06Q 50/01

FOREIGN PATENT DOCUMENTS

| JP | 2010055391 A | 3/2010 |
| JP | 2012150563 A | 8/2012 |
| JP | 2016009460 A | 1/2016 |
| JP | 2017027597 A | 2/2017 |

OTHER PUBLICATIONS

International Search Report of PCT/JP2021/003733 dated Mar. 2, 2021.

* cited by examiner

Primary Examiner — Mila Airapetian
(74) Attorney, Agent, or Firm — MATTINGLY & MALUR, PC

(57) ABSTRACT

An information providing system includes: a wearing data acquisition part configured to acquire wearing data indicating that a user has worn a fashion item; a wearing history storage part configured to store a wearing history based on the wearing data; an information providing part configured to provide the user with information, based on the wearing history; and a merchandise information storage part configured to store information of a merchandise item that is the fashion item, in which the information providing part suggests the merchandise item, based on the wearing history, a merchandise item having a similar feature to an item of either a large number of wearing times or a high wearing frequency in the wearing history and a merchandise item having a dissimilar feature, and the merchandise item, based on a suggestion ratio between the similar merchandise items and the dissimilar merchandise items set for the every user.

20 Claims, 13 Drawing Sheets

FIG. 5

WEARING HISTORY
STORAGE PART 121

| USER ID |
| --- |
| ITEM ID |
| WEARING DATE |
| WEARING FREQUENCY |
| THE NUMBER OF WEARING TIMES |
| MOVEMENT DISTANCE |
| PURCHASED DATE |
| CLEANING DATE |
| . . . |

FIG. 6

| WEARING POINT STORAGE PART 122 |
|---|
| USER ID |
| WEARING POINT |
| WEARING MILEAGE |
| . . . |

FIG. 7

VALUE-ADDED INFORMATION
STORAGE PART 123

| WEARING POINT | VALUE-ADDED INFORMATION |
|---|---|
| WEARING POINT 10 - 30 | · · · |
|  | · · · |
| WEARING POINT 31 - 50 | · · · |
|  | · · · |
| WEARING MILEAGE 10 - 30 | · · · |
| · · · | · · · |

FIG. 8

MERCHANDISE INFORMATION
STORAGE PART 124

| MERCHANDISE ITEM ID |
| --- |
| CATEGORY |
| COLOR |
| MATERIAL |
| TAG |
| TREND SCORE |
| RECOMMENDATION SCORE |
| . . . |

FIG. 9

| USER INFORMATION STORAGE PART 125 |
|---|
| USER ID |
| JOB CATEGORY |
| HABIT |
| BODY SHAPE |
| COMMUTING MODE |
| SPORTS EXPERIENCE |
| BUSINESS TRIP |
| CAR |
| BICYCLE |
| PREFERENCE OF FABRIC |
| PREFERENCE OF COLOR TONE |
| PREFERENCE OF TEXTURE |
| PREFERENCE OF FEELING IN WEARING |
| PREFERENCE OF SIZE FEELING |
| ... |

FIG. 10

PURCHASE HISTORY STORAGE
PART 126

| USER ID |
| --- |
| MERCHANDISE ITEM ID |
| PURCHASED DATE AND TIME |
| ... |

INFORMATION-PROVIDING SYSTEM

TECHNICAL FIELD

The present invention relates to an information providing system.

BACKGROUND ART

Suggestions for merchandise items that match user's preferences are made.

CITATION LIST

Patent Literature

Patent Literature 1: JP 2010-055391 A

SUMMARY OF INVENTION

Technical Problem

Even when merchandise items are suggested, based on only a user's purchase history or trend information, however, the user's preferences may not be always reflected.

The present invention has been made in view of such a background, and has an object to provide users with useful information by utilizing wearing histories of the users.

Solution to Problem

In order to address the above-described issue, the main invention of the present invention is an information providing system including:
   a wearing data acquisition part configured to acquire wearing data indicating that a user has worn a fashion item;
   a wearing history storage part configured to store a wearing history based on the wearing data;
   an information providing part configured to provide the user with information, based on the wearing history; and
   a merchandise information storage part configured to store information of a merchandise item that is the fashion item, in which
   the information providing part suggests the merchandise item, based on the wearing history,
   the information providing part suggests a merchandise item having a similar feature to an item of either a large number of wearing times or a high wearing frequency in the wearing history and a merchandise item having a dissimilar feature, and
   the information providing part suggests the merchandise item, based on a suggestion ratio between similar merchandise items and dissimilar merchandise items set for the every user.

In addition, issues disclosed in the present application and methods for addressing such issues will be clarified through the contents and drawings in embodiments of the present invention.

Advantageous Effects of Invention

According to the present invention, wearing histories of users can be utilized.

BRIEF DESCRIPTION OF DRAWINGS

FIG. 5 is a diagram illustrating a configuration example of information stored in a wearing history storage part.

FIG. 6 is a diagram illustrating a configuration example of information stored in a wearing point storage part.

FIG. 7 is a diagram illustrating a configuration example of information stored in a value-added information storage part.

FIG. 8 is a diagram illustrating a configuration example of information stored in a merchandise information storage part.

FIG. 9 is a diagram illustrating a configuration example of information stored in a user information storage part.

FIG. 10 is a diagram illustrating a configuration example of information stored in a purchase history storage part.

DESCRIPTION OF EMBODIMENTS

Figure 1:
FIG. 1 is a diagram illustrating an outline of an information providing system according to the present embodiment.

The contents in embodiments of the present invention will be listed and described. An embodiment of the present invention has a following configuration.

[Item 1]
   An information providing system includes:
   a wearing data acquisition part configured to acquire wearing data indicating that a user has worn a fashion item;
   a wearing history storage part configured to store a wearing history based on the wearing data;
   an information providing part configured to provide the user with information, based on the wearing history; and
   a merchandise information storage part configured to store information of a merchandise item that is the fashion item, in which
   the information providing part suggests the merchandise item, based on the wearing history,
   the information providing part suggests a merchandise item having a similar feature to an item of either a large number of wearing times or a high wearing frequency in the wearing history and a merchandise item having a dissimilar feature, and
   the information providing part suggests the merchandise item, based on a suggestion ratio between similar merchandise items and dissimilar merchandise items set for the every user.
[Item 2]
   The information providing system according to item 1, in which the information providing part narrows down to equal to or smaller than a predetermined number of merchandise items to be suggested, based on a predetermined score.

[Item 3]

The information providing system according to item 2, in which the information providing part narrows down the merchandise items in accordance with the number of suggestions per one time set for the every user.

[Item 4]

The information providing system according to item 2 or 3, in which the predetermined score is a score based on one or more of a score regarding a trend, a score regarding a recommendation degree of a merchandise provider, a score regarding a degree that matches a user's preference, and a score regarding a purchase action of another person.

[Item 5]

The information providing system according to one of items 2 to 4, in which the predetermined score is a score based on at least a score regarding a trend, a score regarding a recommendation degree of a merchandise provider, a score regarding a degree that matches a user's preference, and a score regarding a purchase action of another person.

[Item 6]

The information providing system according to one of items 1 to 5, further includes a point giving part configured to give a predetermined point based on the wearing data, in which
   the information providing part provides the user with predetermined value-added information based on the point.

[Item 7]

An information providing system includes:
   a wearing data acquisition part configured to acquire wearing data indicating that a user has worn a fashion item;
   a wearing history storage part configured to store a wearing history based on the wearing data;
   an information providing part configured to provide a user with information, based on the wearing history; and
   a point giving part configured to give a predetermined point based on the wearing data, in which
   the information providing part provides the user with predetermined value-added information based on the point.

[Item 8]

The information providing system according to item 6 or 7, in which the wearing data includes information about a distance that has been moved while wearing the item, and
   the point giving part gives the predetermined point based on the distance.

[Item 9]

The information providing system according to one of items 1 to 8, in which
   the information providing part integrates the number of wearing times of the item, based on the wearing history, and
   in a case where the number of integration times exceeds a maximum number of wearing times of the item,
   the information providing part provides information that a wearing limit has been reached.

[Item 10]

The information providing system according to claim 9, further includes a merchandise information storage part configured to store information of a merchandise item that is a fashion item, in which
   the information providing part further provides information of the merchandise item similar to an item that satisfies a condition of the wearing limit.

[Item 11]

The information providing system according to one of items 1 to 10, in which
   the information providing part integrates the number of wearing times of the item, based on the wearing history, and
   in a case where the number of integration times satisfies a cleaning condition of the item,
   the information providing part provides cleaning information.

[Item 12]

The information providing system according to claim 11, further includes a cleaning performed information reception part configured to receive cleaning performed information of the item from the user, in which
   the information providing part integrates the number of wearing times on and after a latest cleaning performed date.

==Outline==

Hereinafter, a merchandise order receiving system according to an embodiment of the present invention will be described. FIG. 1 is a diagram illustrating an outline of an information providing system according to the present embodiment. A user is able to transmit data of having worn each fashion item to a management server 1 via a user terminal 2, and to acquire various types of information from the management server 1.

Figure 2:
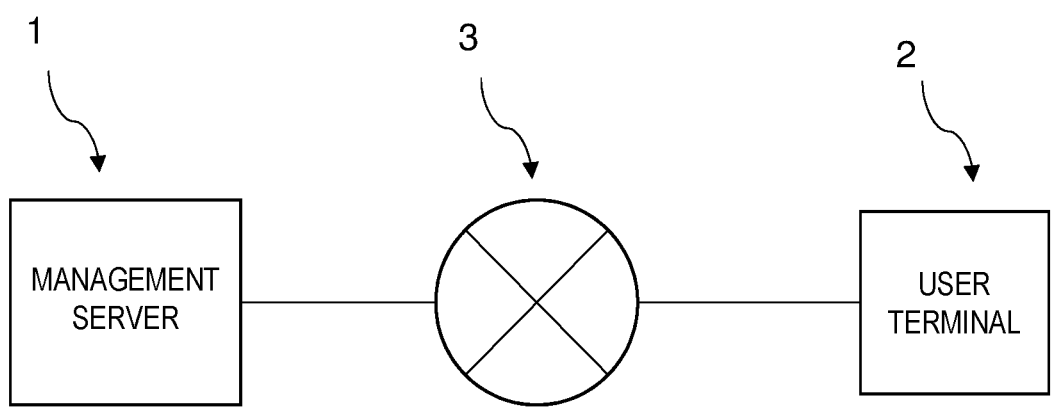
FIG. 2 is a diagram illustrating an overall configuration example of the information providing system according to the present embodiment.

FIG. 2 is a diagram illustrating an overall configuration example of the information providing system according to the present embodiment. The information providing system in the present embodiment includes the user terminal 2 and the management server 1, and the user terminal 2 and the management server 1 are communicably connected with each other through a communication network 3. The communication network 3 is, for example, the Internet, and is constructed with a public telephone network, a mobile telephone network, a wireless communication path, Ethernet (registered trademark), or the like.

The information providing system in the present embodiment is a system that acquires a wearing history of a fashion item. The fashion items in the present invention mean items worn on the body, and includes clothing, hats, gloves, shoes, and the like. Hereinafter, particularly, clothing will be described as an example. In the information providing system in the present invention, wearing history data of clothing is acquired, and thus various types of information can be provided for users.

==User Terminal 2==

The user terminal 2 is a computer operated by a user. The user terminal 2 is, for example, a smartphone, a tablet computer, a personal computer, or the like. The user is able to access the management server 1 via, for example, a web browser executed on the user terminal 2.

==Management Server 1==

Figure 3:
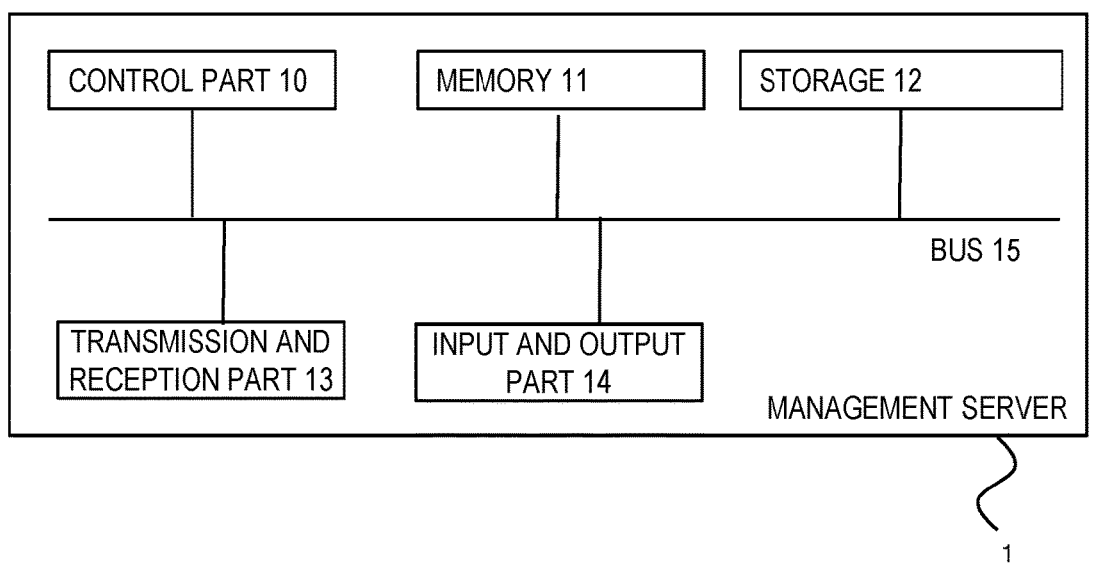
FIG. 3 is a diagram illustrating a hardware configuration example of a management server 1.

FIG. 3 is a diagram illustrating a hardware configuration example of the management server 1. Note that the illustrated configuration is an example, and any other configuration may be included. The management server 1 includes a control part 10, a memory 11, a storage 12, a transmission and reception part 13, and an input and output part 14. The storage 12 is, for example, a hard disk drive, a solid state drive, a flash memory, or the like that stores various types of data and programs. The transmission and reception part 13 is an interface for connection to the communication network 3, and is, for example, an adapter for connection to Ethernet (registered trademark), a modem for connection to a public telephone network, a wireless communication device for wireless communication, a universal serial bus (USB) connector for serial communication, an RS232C connector, or the like. The input and output part 14 is, for example, a keyboard, a mouse, a touch panel, a button, a microphone for inputting data, or a display, a printer, a speaker, or the like for outputting data.

Figure 4:
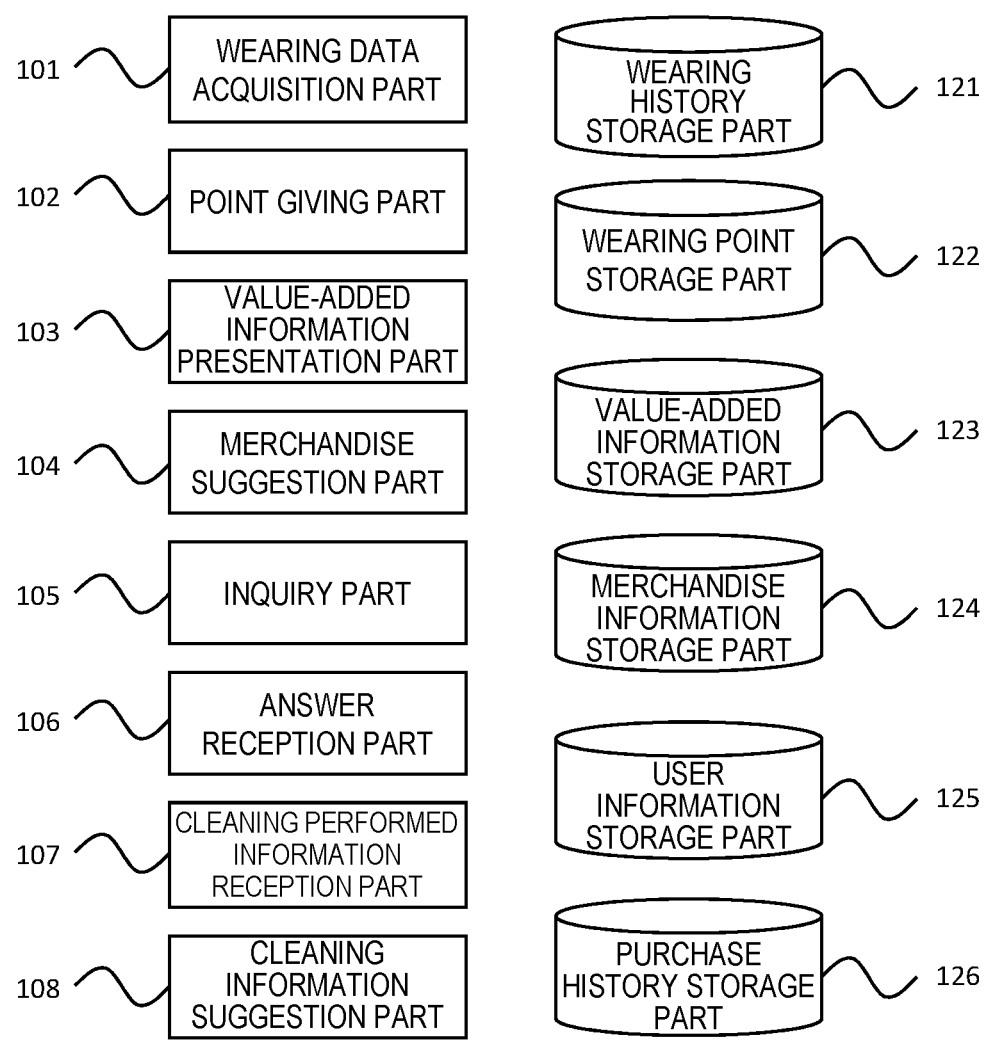
FIG. 4 is a diagram illustrating a software configuration example of the management server 1.

FIG. 4 is a diagram illustrating a software configuration example of the management server 1. As illustrated in the drawing, the management server 1 includes the respective functional parts of a wearing data acquisition part 101, a point giving part 102, a value-added information presentation part 103, a merchandise suggestion part 104, an inquiry part 105, an answer reception part 106, a cleaning performed information reception part 107, and a cleaning information suggestion part 108, and the respective storage parts of a wearing history storage part 121, a wearing point storage part 122, a value-added information storage part 123, a merchandise information storage part 124, a user information storage part 125, and a purchase history storage part 126.

Note that each of the above-described functional parts is implemented by the control part 10 included in the management server 1 reading a program stored in the storage 12 into the memory 11 and executing the program, and each of the above-described storage parts is implemented as a part of the memory 11 included in the management server 1 and a storage area provided by the storage 12.

The wearing history storage part 121 stores a wearing history that the user has worn each fashion item. FIG. 5 is a configuration example of the wearing history information stored in the wearing history storage part 121. The wearing history includes, in association with a user ID, data regarding the wearing history such as a wearing date, a wearing frequency, and the number of wearing times for each item ID, and data regarding a purchase such as a purchase date. The wearing history information is not limited to this, and may include other information as necessary. As the wearing date, the wearing date and time and the like can be sequentially added. As the wearing frequency and the number of wearing times, the wearing frequency and the number of wearing times in a predetermined period can be stored. As the predetermined period, for example, any period such as the latest several weeks, several months, or several years is set. In the wearing history storage part 121, cleaning performed history information about cleaning and washing can be stored. The cleaning performed history information includes, for example, a date of asking for cleaning, a date of washing, and the like. In addition, in the wearing history storage part 121, a movement distance that the user has moved while wearing the item can be stored.

The wearing history storage part 121 may store item information. As the item information, information of a category, a type, a color, a material of the item, and the like can be included. In addition, an ID may be assigned to the category, the type (pattern), the color, and the material, as necessary. Further, tag information can be included in the item information. The tag information is optional information representing a feature of an item, and for example, a feature representing an atmosphere such as "casual", "formal", and "conservative", a feature of a material such as "stretchy", "hardly wrinkled", and "light", a feature of a pattern of a fabric such as "check", "border", and "stripe", and a feature of a color such as "dark" and "bright" can be appropriately set. Regarding the item information, a storage part for storing information of a possessed item may be separately provided, instead of the wearing history storage part 121.

The wearing point storage part 122 stores a wearing point to be given in accordance with the wearing history. FIG. 6 is a configuration example of wearing point information stored in the wearing point storage part 122. Regarding the wearing point, the wearing point that has been given by a predetermined calculation method is stored in association with a user ID. As the wearing point, it is possible to give in any way. For example, one point is given when wearing once. In addition, the point may be added for every category of items such as a jacket, trousers, and a shirt. As another example of the wearing point, a wearing mileage may be given, based on a distance that the user has moved while wearing the item. It is sufficient if any calculation formula is adopted for a method for calculating the wearing mileage. For example, one point or the like can be given per one kilometer.

The value-added information storage part 123 stores contents of value-added information that can be provided for users in accordance with the wearing point. FIG. 7 illustrates a configuration example of the value-added information stored in the value-added information storage part 123. In the present embodiment, the value-added information includes a code or a ticket for users to obtain economic benefits. As the contents of the value-added information, for example, a discount coupon available in a predetermined store, a merchandise voucher, a cleaning service use ticket, and the like can be optionally set. In addition, in order to give an incentive for earning the wearing point, it is possible to set so as to provide more attractive value-added information as the wearing point increases. For example, a plurality of coupons that can be provided for the wearing point that falls within a predetermined range such as 10 to 30 can be set. Further, in a case where the wearing point is calculated for every category of the item, the contents of the value-added information may be set to be different for every category. For example, the value-added information corresponding to the wearing point of a jacket may be a discount ticket for a predetermined jacket item or the like. In addition, the value-added information corresponding to the wearing mileage can be set. Different types of the value-added information may be set respectively for the wearing mileage and the wearing point, or the value-added information that can be issued when both conditions are satisfied may be set (for example, in a case where the wearing point falls within 31 to 50 and the wearing mileage falls within 10 to 30, a certain coupon is provided).

The merchandise information storage part 124 stores information of merchandise items to be sold in an online shop on the Internet or an actual shop. FIG. 8 is a configuration example of the merchandise information stored in the merchandise information storage part 124. As the merchandise information, information of merchandise such as a category, a type (pattern), a color, and a material can be stored for every merchandise item ID. An ID may be assigned in accordance with the category, the type (pattern), the color, and the material. In addition, tag information can be included in the merchandise information. The tag information is optional information representing a feature of a merchandise item, and for example, a feature representing an atmosphere such as "casual", "formal", and "conservative", a feature of a material such as "stretchy", "hardly wrinkled", and "light", a feature of a pattern of a fabric such as "check", "border", and "stripe", and a feature of a color such as "dark" and "bright" can be appropriately set.

The merchandise information storage part 124 may include a trend score. The trend score indicates a degree of a merchandise item that matches the current trend. The trend score is set to, for example, 1 to 10, and a high score (here, maximum 10) can be given to the merchandise item with a strong trend sense. Regarding the trend score, a merchandise provider such as a merchandise manufacturer, a wholesaler, or a manager of an Internet shop is able to give the trend score beforehand. In addition, the trend score may be set, based on sales results of the merchandise items. That is, a method for giving a high score to a merchandise item having a high index regarding sales, such as the number of sales in a predetermined period or an increase rate of the number of sales, may be adopted.

In addition, the merchandise information storage part 124 may include a recommendation score. The recommendation score indicates a degree of a sales promotion by a merchandise provider such as a merchandise item manufacturer, a wholesaler, or a manager of an Internet shop. The recommendation score is set to, for example, 1 to 10, and a high score (here, maximum 10) can be given to a merchandise item with a strong recommendation degree. Regarding the recommendation score, a merchandise provider such as a merchandise item manufacturer, a wholesaler, a manager of an Internet shop, or any other appropriate person is able to give the recommendation score beforehand.

The user information storage part 125 stores information about users. FIG. 9 is a configuration example of user information stored in the user information storage part 125. The user information such as a job category, a posture habit, a body shape, a commuting mode, a sports experience, a frequency of business trip, a transportation means (car, bicycle, or the like), and a user's preference for clothing (fabric, color tone, texture, feeling in wearing, size feeling, or the like) is appropriately registered as necessary in association with a user ID. When a user newly registers a user ID, inputs of the user information may be asked, and then the user information is updated when needed. The content of each item may be selected from options, or may be freely written by the user.

The purchase history storage part 126 stores a purchase history of a merchandise item for every user. FIG. 10 is a configuration example of purchase history information stored in the purchase history storage part 126. The purchase history information includes a user ID, merchandise information such as a merchandise item ID, a purchase date and time, and the like. The merchandise information may be a specific photo or feature (category, design, fabric, color, and the like) of a merchandise item, in addition to the merchandise item ID.

The wearing data acquisition part 101 acquires data regarding the user having worn the clothing. The wearing data includes at least data of an item ID of an item and a date and time when the user wears the item. A method for acquiring the data is not particularly limited, and any method can be adopted. For example, the user selects a fashion item that the user is about to wear on an application of the user terminal, and thus the data may be transmitted to the management server. In addition, by use of a camera function of the user terminal, the user may image the fashion item or the user itself who is wearing the fashion item, so that the image may be analyzed, and the ID of the fashion item may be identified to be used for the wearing history. Further, a QR code (registered trademark) or the like, an NFC tag, an RF tag, or the like printed on a tag or the like of a fashion item may be read by the user terminal, so that the information of having worn the fashion item may be transmitted to the management server. Furthermore, an IC tag such as an NFC tag or an RF tag may be attached to a fashion item, and an antenna may be arranged in an area storing the fashion item such as a closet or a chest of drawers of the user, so that the fashion item having been taken out of the area may be detected. Moreover, the wearing data acquisition part 101 may be any means for acquiring data using Bluetooth (registered trademark) such as a BLE communication module.

In addition, the wearing data acquisition part 101 is capable of acquiring distance data that the user has moved while wearing the item. A method for acquiring movement data is not particularly limited, but for example, the movement data may be acquired by using a GPS function included in the user terminal. In addition, the movement distance may be estimated by reading the NFC tag or the like attached to the clothing at a departure place and further reading the NFC tag or the like at a movement destination. Further, the position of the user's own house is registered beforehand, so that the movement distance may be estimated only by reading the tag at the movement destination. The tag may be read by use of a reader function equipped in the user terminal or by use of an antenna arranged in a town or a facility.

The point giving part 102 calculates a point from the wearing history data in accordance with a predetermined rule. The predetermined rule can be optionally set, and for example, one point can be given, when a certain clothing is worn once. When the wearing history storage part 121 is updated, the point giving part 102 calculates an accompanying point, and updates the wearing point storage part 122 for every user ID.

The value-added information presentation part 103 presents value-added information to the user terminal in accordance with the point. The value-added information presentation part 103 reads the possessed point of the user from the wearing point storage part 122 of the user at a predetermined timing, and reads the value-added information corresponding to the wearing point from the value-added information storage part 123. The value-added information presentation part 103 displays on the user terminal the value-added information that has been read, so that the user is able to use a coupon, a voucher, a service use ticket, or the like. In a case where there are a plurality of pieces of available value-added information, all the pieces of the value-added information may be presented to the user, or a predetermined number may be selected from them and presented to the user. The user is able to display the value-added information on the user terminal, and is able to use the value-added information as appropriate.

The merchandise suggestion part 104 suggests merchandise items that are fashion items to users. The merchandise suggestion part 104 is capable of extracting and suggesting an item that matches a user's preference from the wearing history data of the user. For example, a wearing history of a specific user ID is read from the wearing history storage part 121, and an item ID having either a high wearing frequency or a large number of wearing times is extracted. Here, any condition for extraction can be set, and a condition for extraction in a case where the number of wearing times in a given period (for example, the last one month) is equal to or larger than a predetermined value can be set. Then, a merchandise item is suggested, based on the item having a large number of wearing times (hereinafter, "frequently worn item").

The merchandise suggestion part 104 may suggest a merchandise item, based on a suggestion rule that has been set beforehand. The suggestion rule includes the number of suggestions per one time and a ratio of merchandise items very similar to the frequently worn item of the user (hereinafter, "similar merchandise item") and merchandise items dissimilar to the frequently worn item of the user (hereinafter, "dissimilar merchandise item") among the suggested merchandise items. The number of suggestions per one time can be set to, for example, 1, 3, 10, or the like, and may be set in accordance with a user's preference. For example, questions such as whether the user desires to know only the most suitable merchandise item, whether the user desires to select from a large number of options, and the like are asked, so that the number of suggestions per one time may be set, based on answers to the questions.

In addition, a suggestion ratio between the similar merchandise items and the dissimilar merchandise items denotes ratios of the respective merchandise items suggested at one time. For example, in a case where there is a demand for suggesting not only a merchandise item similar to the frequently worn item but also a merchandise item having a slightly different taste, it is desirable that a certain percentage of the suggested merchandise items should be dissimilar merchandise items. Such a ratio may be set in accordance with a user's preference, or the setting may be changed by analyzing user's purchasing behaviors. That is, in a case where the user purchases only similar merchandise items, the suggestion ratio of the similar merchandise items is increased, so that the suggestion ratio can be adjusted appropriately. The suggestion rule can be stored in a user information storage part or the like. The suggestion ratio between the similar merchandise items and the dissimilar merchandise items may be calculated by analyzing the number of wearing times. For example, the number of wearing times of a certain user for each item in a predetermined period is read from the wearing history storage part 121, and a similarity degree in the feature between the items is calculated. Then, in a case where the similarity degree is equal to or higher than a certain degree, it can be determined that the user tends to wear similar clothing frequently. On the other hand, in a case where the similarity degree is equal to or lower than a certain degree, it can be determined that the user tends to wear clothing having different tastes in a well-balanced manner. A method for calculating the similarity degree is not particularly limited, but as an example, a score may be given to the similarity degree in a given method for the feature (category, type (pattern), color, material, or tag information) of the item, so that the similarity degree may be calculated. In addition, only items each having the number of wearing times equal to or larger than a predetermined value in a predetermined period may be extracted, so that the similarity degree between the items may be calculated.

The merchandise suggestion part 104 selects a similar merchandise item that is similar to the frequently worn item of the user or a dissimilar merchandise item that is not similar, from the merchandise information storage part 124. Whether it is similar can be determined, based on the similarity degree in the feature (category, type (pattern), color, material, or tag information) of the item. For example, a score may be given to the similarity degree for every one of these feature items, and a merchandise item having a similarity degree score equal to or larger than a predetermined value may be regarded as a similar product. In addition, as the dissimilar merchandise item, all merchandise items each having a similarity degree score equal to or smaller than a predetermined value may be set as the dissimilar merchandise items, or a lower limit value of the similarity degree score may be provided in order to exclude a merchandise item having a too low similarity degree score. Any method for giving a score to the similarity degree can be adopted.

The merchandise suggestion part 104 reads feature information of the frequently worn item from the wearing history storage part 121, reads a merchandise item having a similar feature or a common feature to the features from the merchandise information storage part 124, gives a score of the similarity degree to each merchandise item, and classifies into a merchandise item over a predetermined value as "a similar merchandise item" and a merchandise item below the predetermined value as "a dissimilar merchandise item".

The merchandise suggestion part 104 makes a suggestion to the user by narrowing down to the number of merchandise items to be suggested per one time in accordance with the suggestion rule from among the similar merchandise items or the dissimilar merchandise items that have been selected. Any narrowing method can be adopted. For example, in a case of narrowing down the similar merchandise items, several suggestions may be selected sequentially from the merchandise item having a highest similarity degree score, or may be narrowed down randomly from the similar merchandise items.

The merchandise suggestion part 104 may narrow down to a merchandise item to be suggested, based on one or two or more of a trend score representing a popularity degree of a merchandise item, a recommendation score representing a recommendation degree by a merchandise provider such as a merchandise item manufacturer, a wholesaler, or a manager of an Internet shop, a preference score representing a matching degree with a user's preference, and another person's purchase score representing a purchase action of another person.

The trend score representing the popularity degree of a merchandise item is registered in, for example, the merchandise information storage part 124 in association with the merchandise item ID. The trend score is set to, for example, 1 to 10, and a high score (here, maximum 10) can be given to the merchandise item with a strong trend sense. The trend score can be given beforehand by an appropriate person such as a merchandise item manufacturer, a wholesaler, or a manager of an Internet shop. In addition, the trend score may be set, based on sales results of the merchandise items.

For example, the recommendation score is registered in the merchandise information storage part 124 in association with the merchandise item ID. The recommendation score is set to, for example, 1 to 10, and a high score (here, maximum 10) can be given to a merchandise item with a strong recommendation degree. The recommendation score can be given beforehand by an appropriate person such as a merchandise item manufacturer, a wholesaler, or a manager of an Internet shop.

The preference score is calculated, based on user's preference information such as a user's work, frequently used transportation means, and preferences of fabric, color tone, texture, feeling in wearing, size feeling, or the like. For example, features corresponding to the item values of these pieces of preference information are set beforehand (for example, in a case where the texture preference information is "gentle on the skin", fabric="cotton" or the like is set as a corresponding feature), and a score is given to whether each merchandise item has a feature that matches the user's preference information.

The other person's purchase score denotes a score of a merchandise item that has been purchased by another user who has purchased the frequently worn item or a merchandise item similar to the frequently worn item. In the purchase history storage part 126, a merchandise item ID that has been purchased is stored in association with the user ID. Another person's user ID that has purchased the frequently worn item or an item similar to the frequently worn item can be read, and the other person's purchase score can be given to another merchandise item included in the purchase history information of another person's user ID. The other person's purchase score is based on a fact that there is a high possibility that the user similarly would like to have another merchandise item that has been purchased by another person who has purchased the merchandise item that is the same with or similar to the merchandise item of the user.

Regarding a similar merchandise item or a dissimilar merchandise item, the merchandise suggestion part 104 is capable of narrowing down to a merchandise item having a high score in any of the trend score, the recommendation score, the preference score, and the other person's purchase score. In addition, it is possible to narrow down, based on two or more of these scores. In the case of narrowing down based on two or more scores, it is possible to narrow down to a merchandise item having a high total value or a high average value of the scores.

As will be described below, the merchandise suggestion part 104 analyzes a satisfaction degree of the merchandise item that the answer reception part 106 has received from the user terminal and a reason why the user like or does not like the merchandise item, and is capable of reflecting in narrow down the merchandise items. For example, in a case where the reason why the user likes the item is "fabric" with regard to an item of a large number of wearing times, information of the item is read from the wearing history storage part 121 and the fabric is identified. Then, it is possible to set a high preference score to a merchandise item using the same with or similar fabric to the above-described fabric. Conversely, regarding an item of a small number of wearing times, in a case where the reason why the user does not like the item is "fabric", such a fabric of the item may be read from the wearing history storage part 121 to identify the fabric, so that a merchandise item using the same or similar fabric to the above-described fabric may be excluded from merchandise item candidates to be suggested.

The merchandise suggestion part 104 transmits information about suggestions for merchandise items to the user terminal. Any transmission timing can be set, and for example, the information may be included in a push notification of an e-mail newsletter or the like to be transmitted every predetermined period, or may be displayed in a pop-up manner while the user is looking for fashion items in online shopping.

In addition, by using the wearing history data, the merchandise suggestion part 104 is capable of displaying an alert when the user selects a fashion item in online shopping. For example, when the user is about to purchase a merchandise item similar to the item of the number of wearing times equal to or smaller than a predetermined number in a predetermined period, a message such as "You have purchased a similar item in the past, but you do not like it very much" is displayed. A method for determining whether it is a similar item may be conducted by firstly reading the category, type, color, material, and tag information of the item of a small number of wearing times from the wearing history storage part 121 to identify the item, and determining whether the item has a feature common to or similar to the above feature. In addition, the similarity degree score may be calculated as described above, and it may be determined to be a similar merchandise item, in a case where the similarity degree score is equal to or larger than a predetermined value. Further, as will be described below, regarding the item of a small number of wearing times, a reason why the user answered that the user did not like the item may be analyzed, so that a merchandise item for which an alert is to be displayed may be selected. For example, in a case where the reason why the user did not like the item is "material", the material of the item may be read from the wearing history storage part 121 and identified, so that an alert may be displayed for a merchandise item using the same or similar material.

Further, the merchandise suggestion part 104 uses the wearing history data, and is capable of providing information of a wearing limit timing for a specific item. In the present embodiment, a wearing limit indicates a state to be thrown away or replaced by a new purchase. The determination of whether the item reaches the wearing limit may be made, for example, by setting a maximum number of wearing times for every item and determining whether the number of wearing times of the item exceeds the maximum number of wearing times. The maximum number of wearing times can be set, based on a durability test result or the like for every fabric. In addition, the maximum number of wearing times may be estimated, based on the material of the fabric or the thickness of fibers. The merchandise suggestion part 104 is capable of transmitting, to the user terminal, information indicating that it should be thrown away or replaced by a new purchase. Further, a purchase of a similar merchandise item may be suggested at the same time.

The inquiry part 105 transmits an inquiry about a merchandise item to the user terminal. The inquiry about the merchandise item in the present embodiment denotes an inquiry of asking the user the satisfaction degree of the merchandise item, a reason why the user likes the merchandise item, a reason why the user does not like the merchandise item, anything that the user desires an improvement, and the like. For example, the inquiry part 105 reads a merchandise item of the number of wearing times equal to or smaller than a predetermined number of times in a predetermined period from the wearing history storage part 121, and transmits a message or the like to inquiry about the satisfaction degree of the merchandise item and a reason why the number of wearing times is small for the merchandise item. Furthermore, it is possible to inquire about which one of the design, type, color, and material is the reason why the user does not like the item. On the other hand, the inquiry part 105 reads a merchandise item of the number of wearing times equal to or larger than the predetermined number of times in a predetermined period from the wearing history storage part 121, and transmits a message or the like to inquiry about the satisfaction degree of the merchandise item and a reason why the number of wearing times is large for the merchandise item. Furthermore, it is possible to inquire about which one of the design, type, color, and material is the reason why the user likes the item.

The answer reception part 106 receives, from the user terminal, an answer to the inquiry that the inquiry part 105 has transmitted. The received answer may be stored in the wearing history storage part 121, or may be stored in another storage.

The cleaning performed information reception part 107 receives history information of cleaning or washing that has been performed by the user. The cleaning information includes at least an item ID and information about a date when cleaning or washing was performed. The received information can be stored in the wearing history storage part 121, without being limited to this, and may be stored in another storage.

The cleaning information suggestion part 108 is capable of notifying users of cleaning information. The cleaning information in the present embodiment denotes information for encouraging cleaning in a cleaning store or encouraging washing. For example, a cleaning condition that is a condition for suggesting the cleaning or washing is set for every item, so that a notification of the cleaning information about an item that satisfies the condition can be given. The cleaning condition can be a condition based on the number of wearing times, for example, every three wearing times. The cleaning information suggestion part 108 reads, from the wearing history storage part 121, how many times the user has worn the item since the day when the latest cleaning or washing was performed, and determines whether the condition for suggesting the cleaning or washing is satisfied. Then, the cleaning information about the item that satisfies the condition is notified to the user terminal. The cleaning information may include information of a method for cleaning or washing, cautions, and the like. In addition, an application for a cleaning substituting service may be enabled together with the cleaning information. The cleaning substituting service is, for example, a service that a staff visits the user's house to collect clothing for cleaning.

Figure 11:
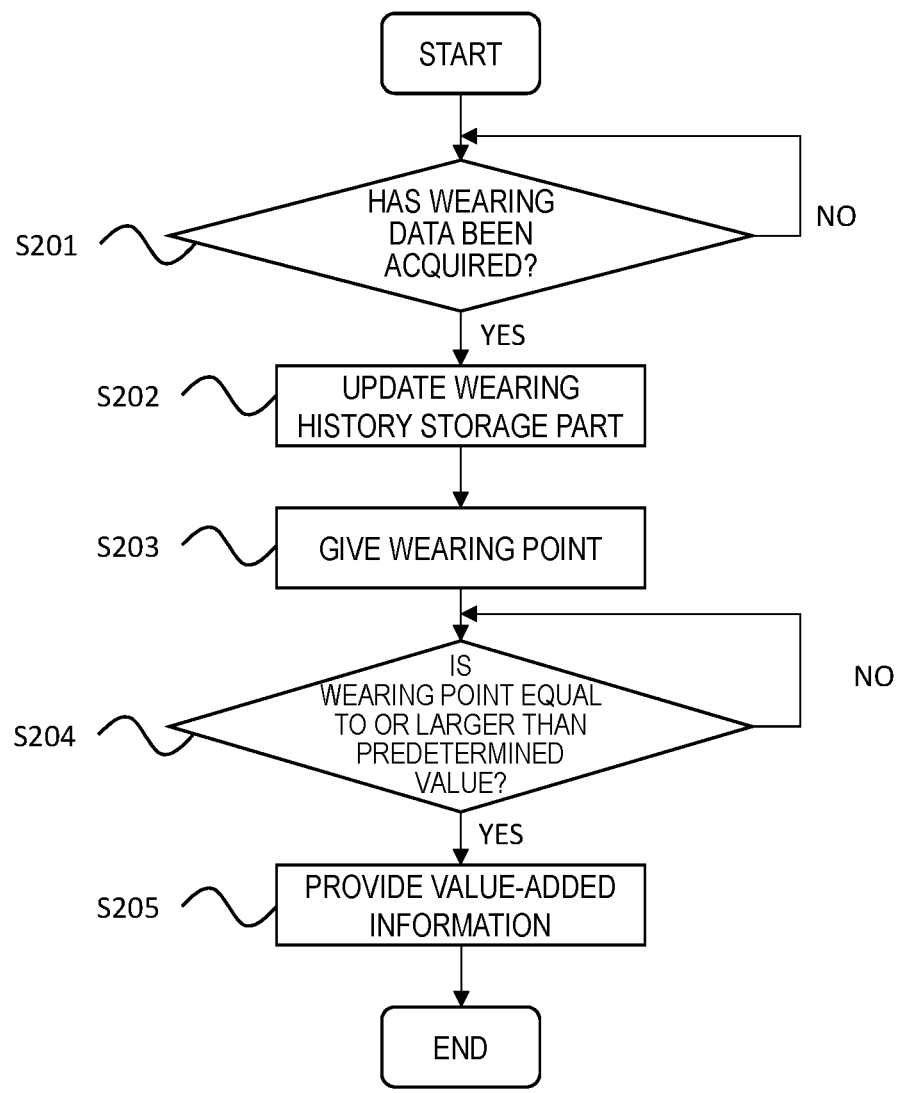
FIG. 11 is a diagram for describing an operation of a merchandise order receiving system in the present embodiment.

FIG. 11 is a diagram illustrating an example of an operation of the information providing system in the present embodiment.

First, in a case where wearing data indicating that the user has worn clothing is acquired from the user terminal (S201), the wearing date and time is recorded in the wearing history data associated with the item ID. In addition, the number of wearing times and the wearing frequency are calculated as necessary, and the wearing history storage part 121 is updated (S202).

Then, when the wearing history storage part 121 is updated, the point giving part 102 calculates the wearing point, based on a predetermined point-giving rule, and the wearing point storage part 122 is updated (S203). When the wearing point storage part 122 is updated, the value-added information presentation part 103 confirms whether the wearing point is equal to or larger than a predetermined point (S204). That is to say, whether the value-added information can be presented at the current wearing point of the user is checked with reference to a value-added information issue condition that has been set in the value-added information storage part 123. Then, in a case where the value-added information can be issued at the current wearing point of the user, the value-added information is provided for the user terminal (S205). In a case where there are a plurality of pieces of value-added information that can be issued, all pieces of the value-added information may be provided, or only a predetermined number of pieces of the value-added information selected randomly or selected based on a predetermined rule from the plurality of pieces of the value-added information may be provided.

Figure 12:
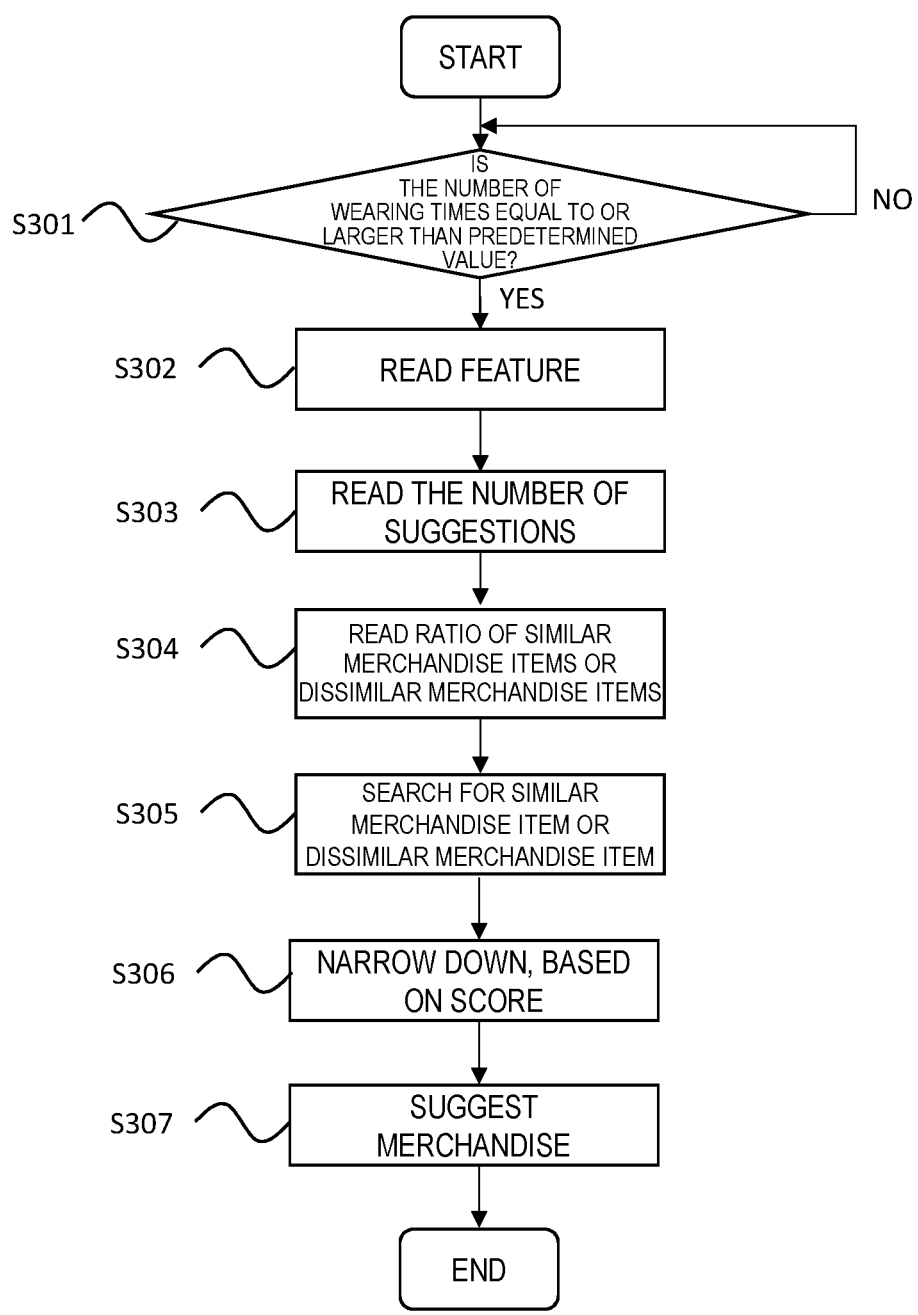
FIG. 12 is a diagram for describing an operation of the merchandise order receiving system in the present embodiment.

FIG. 12 is a diagram illustrating another example of the operation of the information providing system in the present embodiment.

In a case where there is an item of the number of wearing times equal to or larger than a predetermined number in the wearing history storage part 121 (S301), the merchandise suggestion part 104 reads a feature of such a frequently worn item from the wearing history storage part 121 or the like (S302). In addition, the number of merchandise items to be suggested at one time and the suggestion ratio between the similar merchandise items and the dissimilar merchandise items, which are set beforehand for the user, are read (S303, S304).

The merchandise suggestion part 104 searches the merchandise information storage part 124 for a similar merchandise item or a dissimilar merchandise item to the feature of the frequently worn item (S305). For example, the similarity degree scores in the features (category, type, color, material, and tag information) are respectively calculated and these similarity degree scores are integrated or averaged, so that a similarity degree score between the merchandise items is calculated, and a merchandise item having a similarity degree score equal to or higher than a predetermined value is searched for as the similar merchandise item, or a merchandise item having a similarity degree score equal to or lower than the predetermined value is searched for as the dissimilar merchandise item.

Then, the merchandise suggestion part 104 narrows down to a merchandise item from among the similar merchandise items or dissimilar merchandise items, based on the number of suggestions per one time in the suggestion rule (S306). The narrowing may be based on, for example, one or more of the trend score, the recommendation score, the preference score, and the other person's purchase score. The merchandise suggestion part 104 finally suggests the merchandise item that has been narrowed down to the user (S307). The suggestion can be made at any timing. For example, the suggestion may be given while the user is selecting a fashion item in online shopping, or may be given together with a notification of replacement by a new purchase, when an item possessed by the user reaches a timing for replacement by a new purchase.

Figure 13:
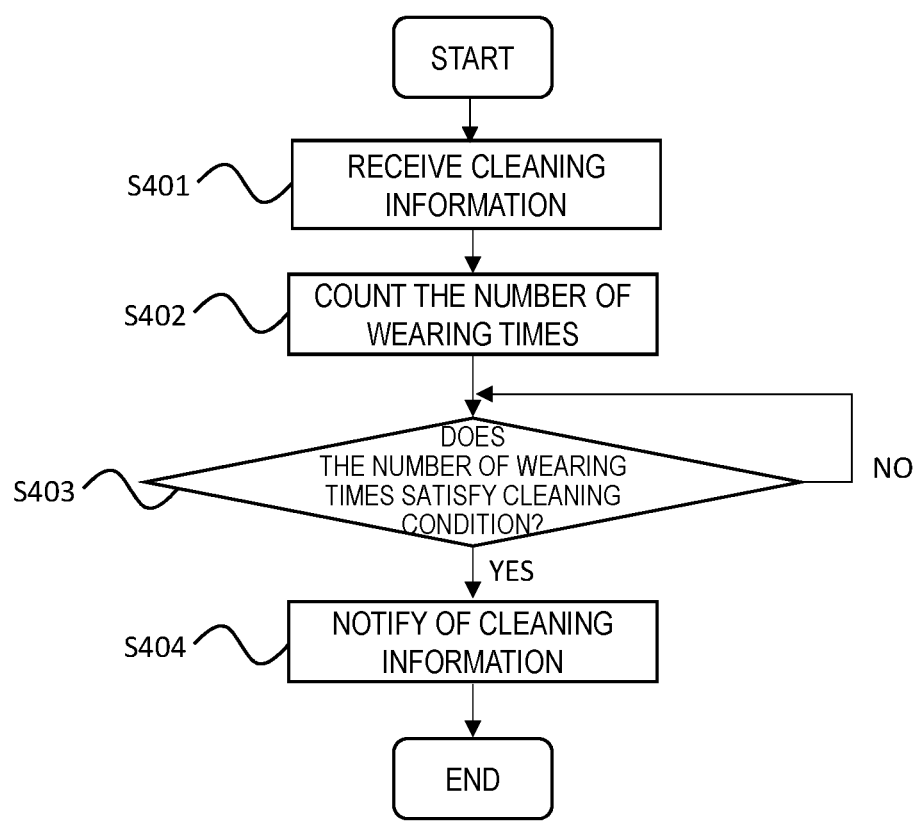
FIG. 13 is a diagram for describing an operation of the merchandise order receiving system in the present embodiment.

FIG. 13 is a diagram illustrating another example of the operation of the information providing system in the present embodiment.

The cleaning information reception part receives information that the clothing has been cleaned or washed from the user terminal (S401). The cleaning performed information is stored in the wearing history storage part 121. The cleaning information suggestion part 108 counts the number of wearing times on and after the previous cleaning performed date, in the wearing history storage part 121 (S402).

The counted number of wearing times is compared with a preset cleaning condition (S403), and in a case where the cleaning condition is satisfied, cleaning information is suggested to the user terminal (S404).

Heretofore, although the present embodiment has been described, the above embodiment is for facilitating the understanding of the present invention, and is not intended to limit the interpretation of the present invention. The present invention can be modified and improved without departing from the gist, and the present invention includes its equivalents.

For example, in the present embodiment, the management server 1 is one computer. However, the present invention is not limited to this, and functional parts and storage parts may be distributed to a plurality of computers. For example, each storage part of the management server 1 may be included in a database server, and the management server 1 may access the database server. Further, the respective functional parts can be provided in a distributed manner in a plurality of computers. For example, a computer including a functional part that transmits to and receives from the user terminal 2 and a computer including a functional part that does not transmit to or receive from the user terminal 2 may be provided individually, so that two computers may perform processes while communicating with each other.

Further, the processes of FIGS. 11 to 13 illustrates an example of the processes by the information providing system in the present embodiment, and do not intend to limit the present invention. The steps included in the processes of FIGS. 11 to 13 may be performed in an order different from the order illustrated in the drawing, a part of the processes may be performed in parallel, a part of the steps may be omitted, and another step may be added.

REFERENCE SIGNS LIST 1 management server
2 user terminal
3 communication network
101 wearing data acquisition part
102 point giving part
103 value-added information presentation part
104 merchandise suggestion part
105 inquiry part
106 answer reception part
107 cleaning performed information reception part
108 cleaning information suggestion part
121 wearing history storage part
122 wearing point storage part
123 value-added information storage part
124 merchandise information storage part
125 user information storage part
126 purchase history storage part

The invention claimed is:

1. An information providing system comprising:
at least one computing device;
a transmitting device;
a receiving device; and
at least one non-transitory storage medium storing thereon at least one program,
wherein the at least one computing device, when executing the at least one program, is configured to:
acquire wearing data indicating that a user has worn a fashion item based at least on communication between one of the transmitting device and the receiving device that is attached to the fashion item and another one of the transmitting device and the receiving device;
store a wearing history based on the wearing data;
provide the user with information, based on the wearing history; and
store information of a merchandise item that is the fashion item, wherein
the at least one computing device suggests the merchandise item, based on the wearing history,
the at least one computing device suggests a merchandise item having a similar feature to an item of either a large number of wearing times or a high wearing frequency in the wearing history and a merchandise item having a dissimilar feature, and
the at least one computing device suggests the merchandise item, based on a suggestion ratio between similar merchandise items and dissimilar merchandise items set for the user.

2. The information providing system according to claim 1, wherein the at least one computing device narrows down to equal to or smaller than a predetermined number of merchandise items to be suggested, based on a predetermined score.

3. The information providing system according to claim 2, wherein the at least one computing device narrows down the merchandise items in accordance with the number of suggestions per one time set for the user.

4. The information providing system according to claim 2, wherein the predetermined score is a score based on one or more of a score regarding a trend, a score regarding a recommendation degree of a merchandise provider, a score regarding a degree that matches a user's preference, and a score regarding a purchase action of another person.

5. The information providing system according to claim 2, wherein the predetermined score is a score based on at least a score regarding a trend, a score regarding a recommendation degree of a merchandise provider, a score regarding a degree that matches a user's preference, and a score regarding a purchase action of another person.

6. The information providing system according to claim 1, wherein the at least one computing device is further configured to:
give a predetermined point based on the wearing data, wherein
the at least one computing device provides the user with predetermined value-added information based on the point.

7. An information providing system comprising:
at least one computing device;
a transmitting device;
a receiving device; and
at least one non-transitory storage medium storing thereon at least one program,
wherein the at least one computing device, when executing the at least one program, is configured to:
acquire wearing data indicating that a user has worn a fashion item based at least on communication between one of the transmitting device and the receiving device that is attached to the fashion item and another one of the transmitting device and the receiving device;
store a wearing history based on the wearing data;
provide the user with information, based on the wearing history; and
give a predetermined point based on the wearing data, wherein
the at least one computing device provides the user with predetermined value-added information based on the point.

8. The information providing system according to claim 7, wherein
the wearing data includes information about a distance of movement of the one of the transmitting device and the receiving device, and
the at least one computing device gives the predetermined point based on the distance.

9. The information providing system according to claim 1, wherein
the at least one computing device integrates the number of wearing times of the item, based on the wearing history, and
in a case where the number of integration times exceeds a maximum number of wearing times of the item,
the at least one computing device provides information that a wearing limit has been reached.

10. The information providing system according to claim 9, wherein
the at least one computing device further provides information of the merchandise item similar to an item that satisfies a condition of the wearing limit.

11. The information providing system according to claim 1, wherein
the at least one computing device integrates the number of wearing times of the item, based on the wearing history, and
in a case where the number of integration times satisfies a cleaning condition of the item, the at least one computing device provides cleaning information.

12. The information providing system according to claim 11, wherein at least one computing device is further configured to:
  receive cleaning performed information of the item from the user, wherein
  the at least one computing device integrates the number of wearing times on and after a latest cleaning performed date.

13. The information providing system according to claim 1, wherein
  wherein a distance of movement of the one of the transmitting device and the receiving device is determined based on at least the communication between the one of the transmitting device and the receiving device and the another one of the transmitting device and the receiving device.

14. The information providing system according to claim 1, wherein
  a distance of movement of the one of the transmitting device and the receiving device is acquired using GPS.

15. The information providing system according to claim 1, further comprising a plurality receiving devices, wherein
  the another one of the transmitting device and the receiving device comprises a plurality of receiving devices and a distance of movement of the one of the transmitting device and the receiving device is determined based on detection of the one of the transmitting device and the receiving device by at least one of the plurality of receiving devices.

16. The information providing system according to claim 13, wherein
  the another one of the transmitting device and the receiving device includes an antenna.

17. The information providing system according to claim 15, wherein
  the plurality of receiving devices include a plurality of antennas.

18. The information providing system according to claim 15, wherein
  the distance of movement of the one of the transmitting device and the receiving device is determined based on detection of the one of the transmitting device and the receiving device by at least two of the plurality of receiving devices.

19. An information providing system comprising:
  at least one computing device; and
  at least one non-transitory storage medium storing thereon at least one program,
  wherein the at least one computing device, when executing the at least one program, is configured to:
  acquire wearing data indicating that a user has worn a fashion item based at least on communication with the fashion item;
  store a wearing history based on the wearing data;
  provide the user with information, based on the wearing history; and
  store information of a merchandise item that is the fashion item, wherein
  the at least one computing device suggests the merchandise item, based on the wearing history,
  the at least one computing device suggests a merchandise item having a similar feature to an item of either a large number of wearing times or a high wearing frequency in the wearing history and a merchandise item having a dissimilar feature, and
  the at least one computing device suggests the merchandise item, based on a suggestion ratio between similar merchandise items and dissimilar merchandise items set for the user.

20. An information providing system comprising:
  at least one computing device; and
  at least one non-transitory storage medium storing thereon at least one program,
  wherein the at least one computing device, when executing the at least one program, is configured to:
  acquire wearing data indicating that a user has worn a fashion item based at least on communication with the fashion item;
  store a wearing history based on the wearing data;
  provide the user with information, based on the wearing history; and
  give a predetermined point based on the wearing data, wherein
  the at least one computing device provides the user with predetermined value-added information based on the point.

* * * * *